US010280005B2

(12) United States Patent
Stauber

(10) Patent No.: US 10,280,005 B2
(45) Date of Patent: May 7, 2019

(54) CONVEYING SYSTEM FOR CONVEYING OBJECTS TO BE CONVEYED

(71) Applicant: Ferag AG, Hinwil (CH)

(72) Inventor: Erwin Stauber, Grüt (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/660,382

(22) Filed: Jul. 26, 2017

(65) Prior Publication Data

US 2018/0037413 A1 Feb. 8, 2018

(30) Foreign Application Priority Data

Aug. 2, 2016 (CH) ...................................... 1003/16

(51) Int. Cl.
*B65G 17/20* (2006.01)
*B65G 17/32* (2006.01)
*B65G 17/38* (2006.01)
*B65G 19/02* (2006.01)
*B65G 9/00* (2006.01)

(52) U.S. Cl.
CPC ............. *B65G 17/20* (2013.01); *B65G 17/32* (2013.01); *B65G 17/38* (2013.01); *B65G 19/025* (2013.01); *B65G 9/00* (2013.01)

(58) Field of Classification Search
CPC ........ B65G 17/20; B65G 17/32; B65G 17/38; B65G 19/025
USPC ... 198/465.2, 465.4, 474.1, 678.1, 683, 684, 198/867.14; 104/172.1, 172.4
See application file for complete search history.

(56) References Cited

U.S. PATENT DOCUMENTS

| 4,840,124 A | * | 6/1989 | Tadashima | ............. | D01H 9/182 |
| | | | | | 104/163 |
| 5,819,906 A | * | 10/1998 | Enderlein | ............. | B61B 10/025 |
| | | | | | 198/687.1 |
| 6,360,671 B1 | * | 3/2002 | Nakagami | ............... | B61B 13/00 |
| | | | | | 104/106 |
| 6,588,579 B2 | * | 7/2003 | Taeger | ................... | B65G 17/20 |
| | | | | | 104/172.1 |
| 7,694,803 B1 | * | 4/2010 | Call | ....................... | B65G 39/20 |
| | | | | | 104/172.5 |

(Continued)

FOREIGN PATENT DOCUMENTS

| CH | 707798 | 9/2014 |
| DE | 1 137 685 | 10/1962 |

(Continued)

OTHER PUBLICATIONS

US 2015/0266677 A1, Fenile et al., Sep. 24 (Year: 2015).*

(Continued)

*Primary Examiner* — Douglas A Hess
(74) *Attorney, Agent, or Firm* — Rankin, Hill & Clark LLP

(57) ABSTRACT

A conveying system including a conveying rail, at least one conveying vehicle, which is led along the conveying rail, wherein the at least one conveying vehicle forms a contact element, and also including a driver chain with at least one driver for driving the at least one conveying vehicle in the conveying direction. The driver forms a receiver for receiving the contact element for the purpose of forming a driving contact. The driver includes a deflecting member that forms a spatial limitation for the receiver. The deflecting member is elastically deflectable by the contact element while opening up the receiver.

21 Claims, 5 Drawing Sheets

(56) References Cited

U.S. PATENT DOCUMENTS

| | | | | |
|---|---|---|---|---|
| 8,733,537 | B2* | 5/2014 | Nukui | B65G 17/485 |
| | | | | 198/683 |
| 9,205,990 | B2 | 12/2015 | Otto | |
| 9,850,071 | B2* | 12/2017 | Fenile | B65G 19/025 |
| 10,017,326 | B1* | 7/2018 | Puskar | B65G 17/30 |
| 10,046,914 | B1* | 8/2018 | Otto | B65G 19/025 |

FOREIGN PATENT DOCUMENTS

| | | |
|---|---|---|
| DE | 10 2010 016 777 | 11/2011 |
| DE | 10 2013 100 132 | 7/2014 |
| DE | 10 2014 226 600 | 6/2016 |
| EP | 1 123 850 | 8/2001 |
| EP | 2 385 002 | 5/2013 |
| JP | 2002-120920 | 4/2002 |
| WO | 2008/135088 | 11/2008 |

OTHER PUBLICATIONS

Switzerland Search Report dated Oct. 17, 2016 Application No. 01003/16, 2 pages.
Extended European Search Report dated Dec. 15, 2017, Application No. 17 18 3424, 9 pages.

* cited by examiner

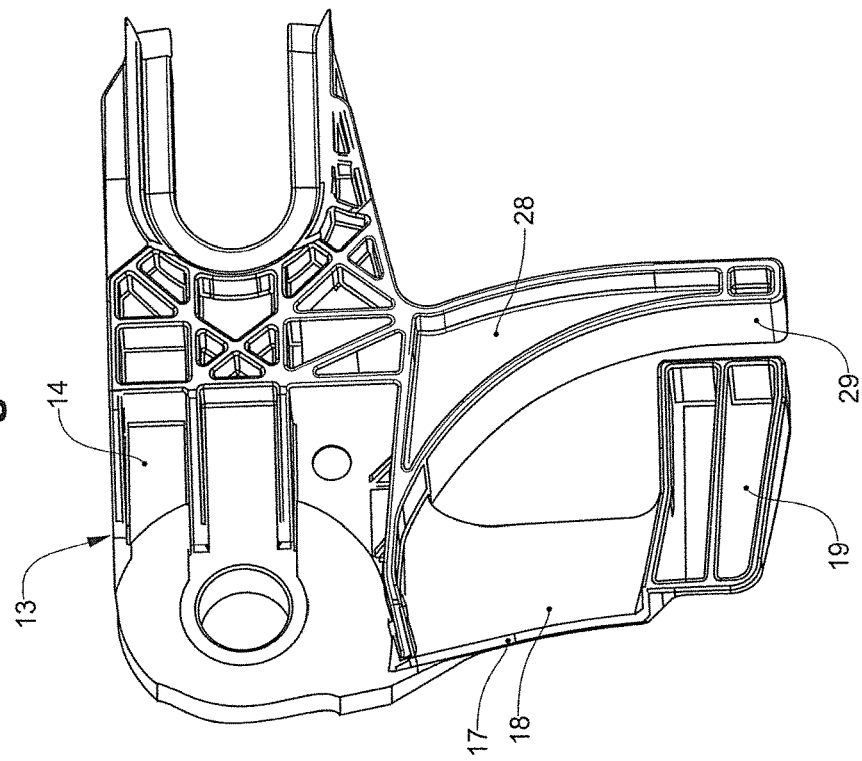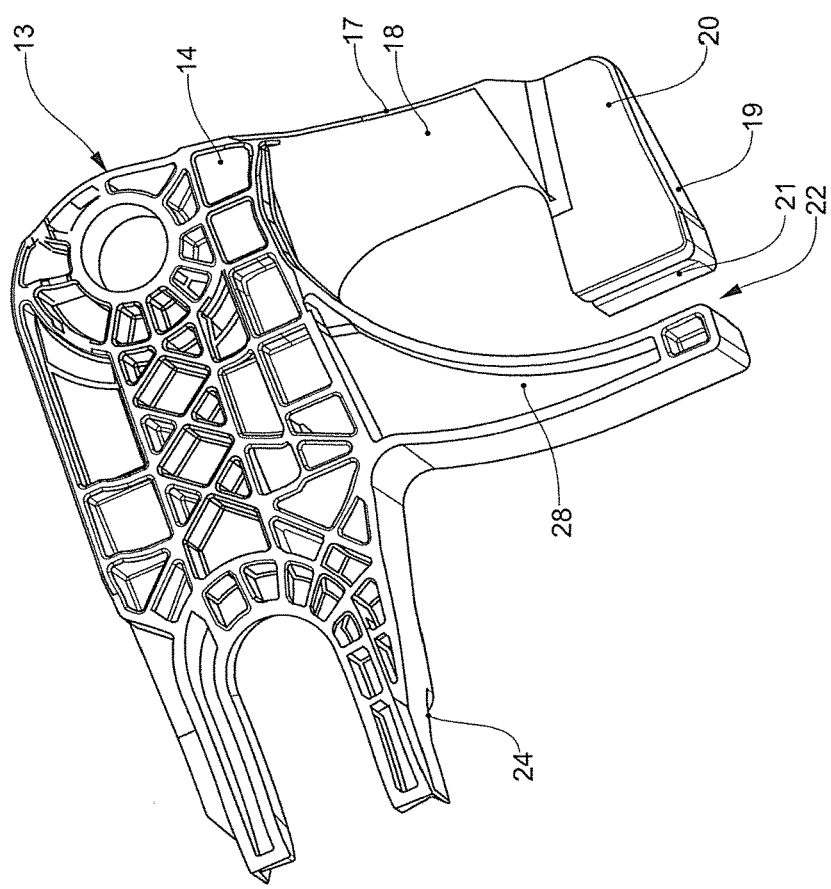

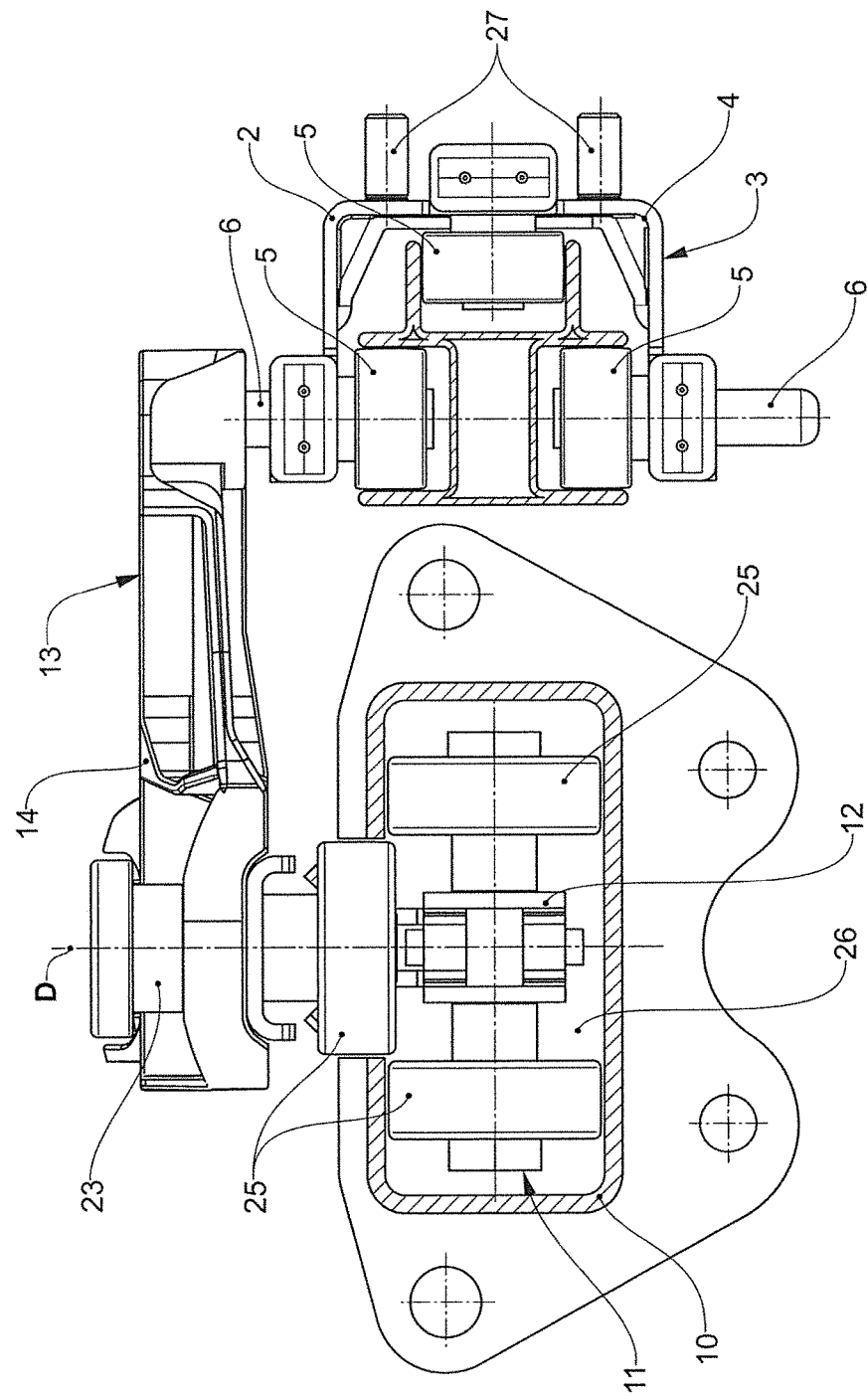

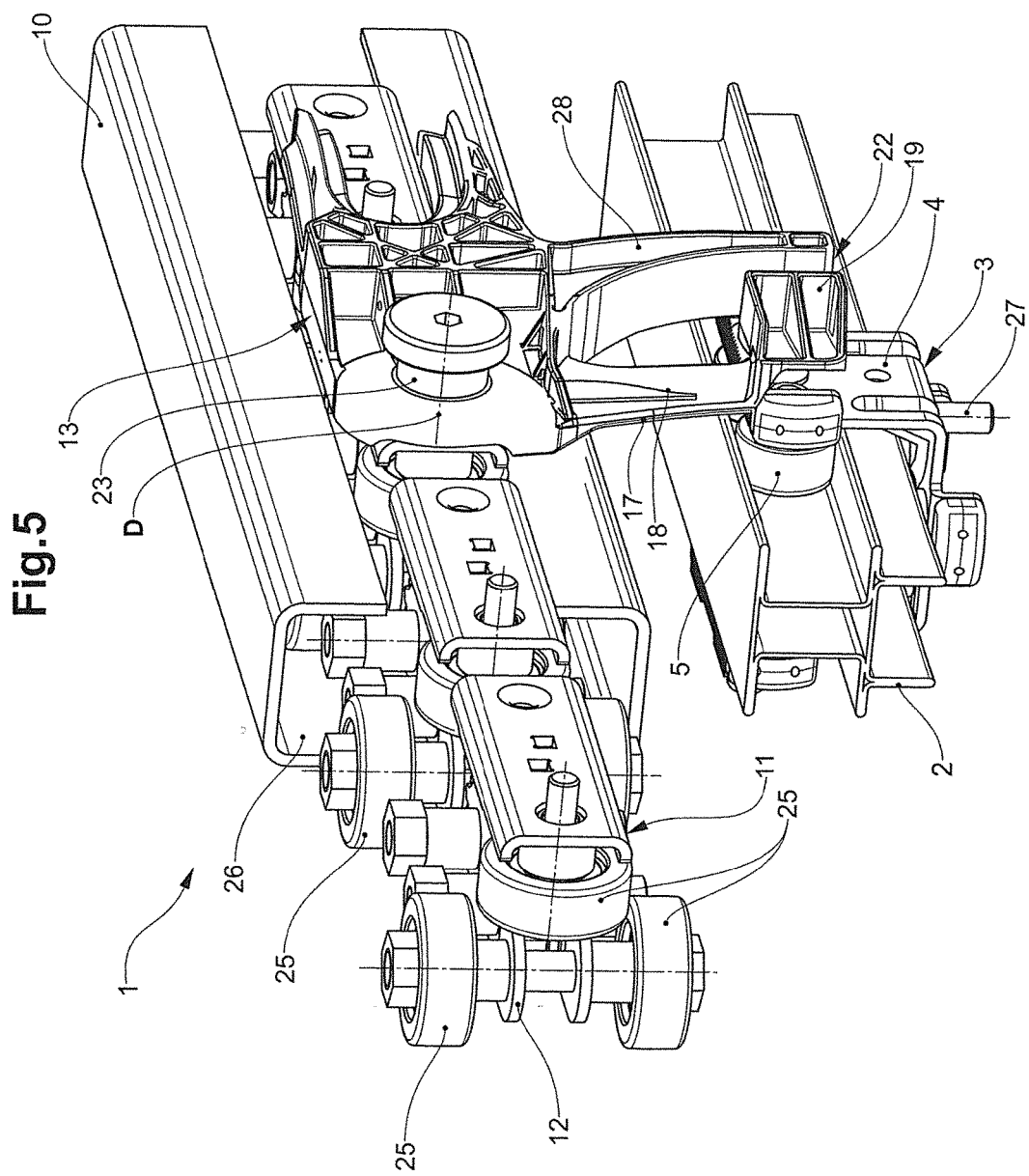

CONVEYING SYSTEM FOR CONVEYING OBJECTS TO BE CONVEYED

BACKGROUND OF THE INVENTION

Field of the Invention

The invention lies in the field of transport and conveying technology, in particular of intra-logistics. The invention relates to a rail-led conveying system with a conveying rail, as well as with at least one conveying vehicle that is led along the conveying rail, wherein the at least one conveying vehicle forms a contact element for forming a driving contact, further with a driver chain with at least one driver for driving the at least one conveying vehicle in the conveying direction, wherein the driver forms a receiver for receiving the contact element for the purpose of forming the driving contact.

Description of Related Art

Conveying systems of the type mentioned above are known from the state of the art. The conveying vehicles of such conveying systems in particular are designed as individual vehicles with runner rollers or sliding elements, the vehicles being able to be moved along the conveying rail independently of the other conveying vehicles. Such conveying systems permit the conveying of individual conveyed objects by way of conveying vehicles along individual conveying paths which are independent of the conveying paths of other conveying vehicles.

The conveying paths are set by the course of the conveying rails, along which the conveying vehicles are led. The conveying systems can include branches with diverters (points) for forming individual conveying paths.

In particular, such conveying systems are applied in intra-logistics where conveyed objects are to be sorted, for example according to certain criteria or are to be compiled into conveyed object units.

As a rule, the mentioned conveying systems form closed conveying paths, along which the conveying vehicles are moved in a circulatory manner. Here, the conveying vehicles can be driven in different manners.

Gravitational conveying systems, which are characterised in that the conveying vehicles are conveyed along a conveying path at least in sections by way of gravitational assistance, are known. The conveying path accordingly has a descent in the region of the gravitational conveying. Normally, the conveying vehicles are not actively driven along such conveying sections.

However, common to all conveying systems is the fact that the conveying vehicles need to be actively driven at least along a section of a conveying path. This also applies to gravitational conveying systems.

Concerning gravitational conveying systems, the conveying vehicles need to be conveyed along a conveying path section with an ascent from a lower level to a higher level for example by way of an active drive before these can be conveyed along a conveying path section with a descent by way of gravity.

The mentioned conveying systems and in particular the gravitational conveying systems are often designed as suspended-conveying systems for the suspended conveying of the conveyed objects. Suspended-conveying system in particular are characterised in that the conveying vehicles at least in sections are led below the conveying rail.

Conveying systems with an actively driven driver chain with drivers which with contact elements of the conveying vehicles form a driving contact are known. The conveying vehicles are actively driven at least along a section of the conveying path via the contact elements which are in driving contact with the driver.

The driving contact between the conveying vehicle and the driver is formed in the so-called merging section, also called lock-in section, which corresponds to a conveying path section, in which the drivers and conveying vehicles are brought together for the purpose of a driving contact.

In the state of the art, there are a multitude of embodiments that differ from one another solely by the structural and functional design of the driving contact between the conveying vehicle and the driver.

For example, the published document EP 2 385 002 B1 describes a suspended-conveying system with a plurality of conveying vehicles as well as with a driver chain. The driver chain includes drivers that are attached to the chain body of the driver chain. The drivers each include a recess for receiving a contact element of the conveying vehicle, for the purpose of forming a driving contact. A section of the driver, which leads in the conveying direction, forms a ramp that permits the drivers to run gently over the conveying vehicles. The running-over of the conveying vehicles ends with the engagement of the contact element into the recess, wherein the driver is pressed downwards due to the gravity, which acts upon this and the driving contact is created.

The design of the driving contact by way of the driver running over the conveying vehicle is a technical embodiment that one frequently comes across in the state of the art.

Concerning this embodiment, one utilises the fact that the intrinsic weight of the running-over driver or the running-over driver chain as a rule is sufficient in order to create and maintain a driving contact between a contact element and a recess on the driver.

However, there are also conveying systems according to which the conveying vehicles or their contact elements are to be led onto the drivers in a lateral manner, i.e. transversely to the conveying direction, for example due to the drivers running over of the conveying vehicles being out of the question.

Since the drivers and conveying vehicles as a rule are not brought together in a cyclically synchronous manner, the recesses of the drivers and the contact elements of the conveying vehicles are not aligned to one another in the merging section for creating the driving contact. Consequently, the receiver and contact element do not engage into one another without further ado on bringing the drivers and conveying vehicles together.

The reason for this is fact that as a rule the conveying vehicles arrive in the merging section individually and independently of one another at irregular time intervals, i.e. independently of the cycle and therefore firstly need to be paced into the cycle of the driver chain.

The pacing of the conveying vehicles into the cycle of the conveying (driver) chain and the creation of the driving contact entailed by this as a rule is achieved by way of the conveying vehicles being conveyed into the merging section at a conveying speed which is different to that of the drivers of the driver chain. In this manner, the contact elements of the conveying vehicles move relative to the drivers in the merging section, until these contact elements meet the respective recess on the driver and engage into these whilst forming a driving contact.

However, suitable technical measures are necessary in order to ensure that the contact element, as soon as it meets the associated receiver of driver, does indeed engage into the recess for creating the driving contact, and that the driving contact which is formed in such a manner is also maintained.

SUMMARY OF THE INVENTION

It is therefore the object of the present invention to suggest a solution, according to which the conveying vehicles in the merging section are led laterally onto the drivers whilst forming a driving contact and can be paced into the cycle of the driver chain whilst creating a driving contact. The driving contact should also be maintained with the subsequent conveying.

In particular, the driving contact should be able to be created without the complete driver having to carrying out an evasive movement, as is the case for example with the running-over of the driver, as described above.

Moreover, no gravitational assistance should be necessary for the creation of the driving contact, as is the case for example with conveying systems with running-over drivers.

The conveying vehicle according to the invention is characterised in that the driver includes a deflecting member, which forms a limitation for the receiver, wherein the deflecting member is elastically, in particular spring-elastically deflectable transversely to the conveying direction by the contact element whilst opening up (freeing or unblocking) the receiver.

In the present patent application, transversely to the conveying direction in particular means in a direction transverse to the conveying direction and parallel or essentially parallel to a horizontal plane.

"Essentially parallel" in this application means that the deviation of the direction course is least than 10° (angle degrees).

The deflection of the deflecting member by the contact element is activated by a relative movement between the contact element and the driver in the merging section. The relative movement in particular includes a movement component parallel to the conveying direction. The relative movement in particular runs essentially parallel to the conveying direction.

With this procedure, the contact element exerts a deflecting force upon the deflecting member. This deflecting force leads to the deflection of the deflecting member transversely to the conveying direction.

A restoring force, which is directed counter to the deflecting force, also acts upon the deflected deflecting member. In the absence of the deflecting force, the deflecting member is moved back again into its initial position due to the restoring force.

The return movement can be a springing-back in a manner such that the contact element snaps into the receiver.

This, e.g., is the case when the contact element has assumed its position in the receiver and the driving contact is created.

In the initial position, the deflecting member forms a delimitation of the receiver. The contact is thus secured or blocked against sliding out of the receiver parallel to the conveying direction.

This means that the deflecting member is captured in the receiver by way of the return movement or springing-back of the deflecting member.

The term "relative movement" means that the conveying vehicles or the contact element and the drivers are moved parallel to the conveying direction at different speeds.

As a rule, the driver chain is moved in the conveying direction along the merging section.

The conveying vehicles in particular are likewise moved into the merging section with a direction component in the conveying direction. However, the conveying vehicles are moved into the merging section in particular at a lower speed than the drivers, so that the drivers with their deflecting members each run onto the contact elements of the conveying vehicles.

However, the conveying vehicles can also be moved into the merging section with a direction component counter to the conveying direction, so that the conveying vehicles with their contact elements run onto these oncoming deflecting members of the drivers.

In the merging section, the conveying vehicles are led onto the drivers in particular with a lateral direction component. In particular, "lateral" means transverse to the conveying direction.

The receiver in particular is arranged laterally of the conveying vehicle or of its contact element on forming the driving contact.

The deflecting member, which is deflected by the contact element, thereby opens up (frees) the receiver, in particular in a merging direction which runs essentially parallel to the conveying direction. The merging direction corresponds to that direction in which the contact element moves relative to the driver into the receiver.

According to a further development of the invention, the deflecting member forms a sliding surface for the contact element. The contact element slides along this sliding surface into the receiver amid the deflection of the deflecting member transversely to the conveying direction.

In particular, the sliding surface is designed in a manner such that the contact element slides along the sliding surface in a relative movement, which is between the contact element and the driver and which runs parallel to the conveying direction, and slides into the receiver subsequently to the sliding surface.

The sliding surface in particular is a sliding-on surface. This means that in particular, the sliding surface is designed such that the contact element in a relative movement, which is between the contact element and the driver and which runs essentially parallel to the conveying direction, slides along the sliding surface in the direction of the receiver onto the deflecting member amid an increasing deflection of the deflecting member.

The sliding-on surface in particular is part of a ramp-like sliding-on body on the deflecting member, onto which sliding-on body the contact element slides, the part activating the increasing deflection of the deflecting member.

The sliding surface, in particular the sliding-on body can be designed in an arched or plane manner.

According to a further development of the invention, the sliding surface considered in the conveying direction is increasingly set back (displaced back) with respect to the contact element, which is assigned to this, and transversely to the conveying direction. A ramp-like sliding-on body with a sliding-on surface, which ascends counter to the conveying direction, is formed in this manner.

The deflecting member in particular forms an elastic deflecting section, which connects onto a base body of the driver. The deflecting section in particular is an integral constituent of the driver.

The deflecting section can be of a plastic. The deflecting member can be manufactured of plastic, e.g., in an injection moulding method.

However, the deflecting section can also be of a metal such as spring steel. The deflecting section can also be of a composite material.

A single-part manufacture of the driver permits a reduction of the components and therefore simplifies the manufacture of the driver chain or of the driver and reduces the manufacturing costs.

The deflecting section can designed, e.g., in a tab-like manner.

A guide body, which forms the sliding surface, can be formed at a free end of the deflecting member.

The guide body can form the ramp-like sliding-on body, which is described above, or correspond to this.

In particular, the guide body forms a limitation for the receiver.

The guide body connects in particular to the deflecting section and is connected to the base body of the driver via the deflecting section. The guide body and the deflecting section together with the base body in particular are an integral constituent of the driver.

The elastic deflectability of the deflecting member can also be achieved by way of a separate spring element, such as helical spring, which is arranged between the guide body and the base body of the driver. The spring element, which is therefore part of the deflecting section, connects the guide body to the base body of the driver.

In particular, the receiver is designed as a recess. The receiver in particular is slot-like In particular, the receiver is formed by a first and second limitation. The receiver can be formed exclusively by the two limitations.

Considered in the conveying direction, the two limitations form a front and a rear limitation.

The two limitations in particular lie opposite one another and are distanced to one another.

In particular, the two limitations are formed by the driver.

The first limitation, which in particular is the front limitation, is formed by the deflecting member, as already mentioned above.

According to a further development of the invention, the second limitation is formed by a free end-section of a limitation arm of the driver. The limitation arm in particular is an integral part of the driver.

The limitation arm can have elastic characteristics which permit the contact element to escape from the receiver, which is moved further with the driver chain, without damage to the components, given a blockage of the conveying vehicle. For this, the limitation arm is elastically deflected by the contact element The two limitations are each characterised in particular by a limitation surface, which border in or enclose the receiver.

According to a further development of the invention, the receiver is open transverse to the conveying direction. This permits the contact element to move laterally out of the receiver.

According to a further development of the invention, the receiver is open to the bottom. This permits the contact element to move downwards out of the receiver.

In particular, the contact element is a projecting body such as a stud, pin, lobe or lug. The contact element in particular projects laterally, i.e. transversely to the conveying direction, beyond the base body of the conveying vehicle.

In particular, the drivers are fastened to the chain body as separate components, in particular in a releasable manner. The drivers in particular are fastened on the chain body in a limitedly rotatable manner.

According to a further development of the invention, the drivers are each rotatably mounted in a limited manner on the chain body of the driver chain about a rotation axis, which is aligned transversely to the conveying direction.

The drivers are each fastened to the chain body in particular about a pivot body with a rotation axis, which is aligned transversely to the conveying direction.

According to a further development of the invention, the driver forms a fork-like receiving section. Here, the drivers with their fork-like receiving sections each encompass the pivot body of a trailing, constructionally equal driver.

In particular, the driver chain or the associated chain body is led along a guide rail. The chain body in particular is led in a guide channel of the guide rail.

The chain body can include guide rollers, by way of which this is rollingly guided along the guide profile, in particular in the guide channel of this profile.

The chain body is actively driven via a suitable drive for driving the conveying vehicles. The chain body can therefore be driven via a drive wheel having a toothing.

In particular, the conveying system includes a plurality of conveying vehicles which are movable independently of one another.

The at least one conveying vehicle in particular includes a runner roller, via which the conveying vehicle is rollingly movable along the conveying rail.

In particular, the conveying vehicle can include several runner rollers, which are arranged on the conveying vehicle in a manner such that the conveying vehicle is rigidly guided along the conveying rail. "Rigidly guided" in particular means that the conveying vehicle is not tiltable relative to the conveying rail.

The conveying vehicle moreover in particular includes a holding member for holding a conveyed object. The holding member can be a hook, a holding eyelet, a magnet, a pin or a gripper or clip/clamp.

The conveying system in particular is designed as a suspended-conveying system. Such a suspended-conveying system has already been explained beforehand. The conveyed objects here are predominantly conveyed in a suspended manner.

In particular, the conveying system is designed as a gravitational conveying system. Such a gravitational conveying system has already been explained above. The conveyed objects here are conveyed along a descent by way of gravitational assistance at least over a conveying path section.

In particular, the conveying system is a gravitational conveying system for the suspended conveying of conveyed objects.

The conveying vehicles can be laterally fed whilst forming a driving contact with the driver chain thanks to the conveying system according to the invention. The contact elements can move gently into the receivers thanks to the deflecting member. Accordingly, the merging procedure is uniform and smooth/quiet.

BRIEF DESCRIPTION OF THE DRAWINGS

The subject-matter of the invention is hereinafter described in more detail by way of an embodiment example, which is represented in the accompanying figures. In each case are represented schematically in:

FIG. 3a, 3b are perspective views of a driver;

FIG. 4 is a cross-sectional view of the conveying system according to FIGS. 1 to 3;

FIG. 5 is a perspective view of a further detail of a conveying system according to the invention and according to FIGS. 1 to 4.

DETAILED DESCRIPTION OF THE INVENTION

Figure 1:
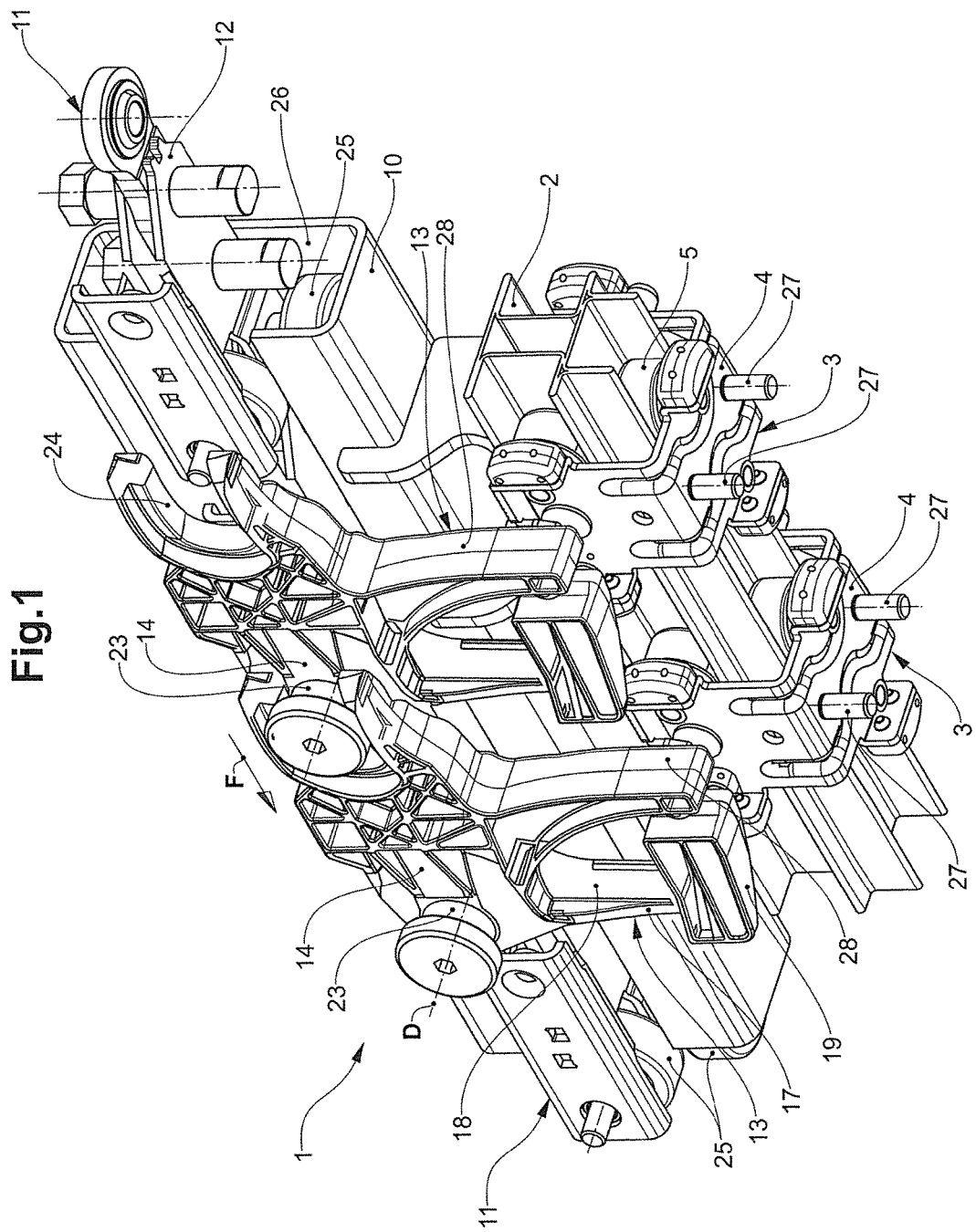
FIG. 1 is a perspective view of a detail of a conveying system according to the invention.
Figure 2:
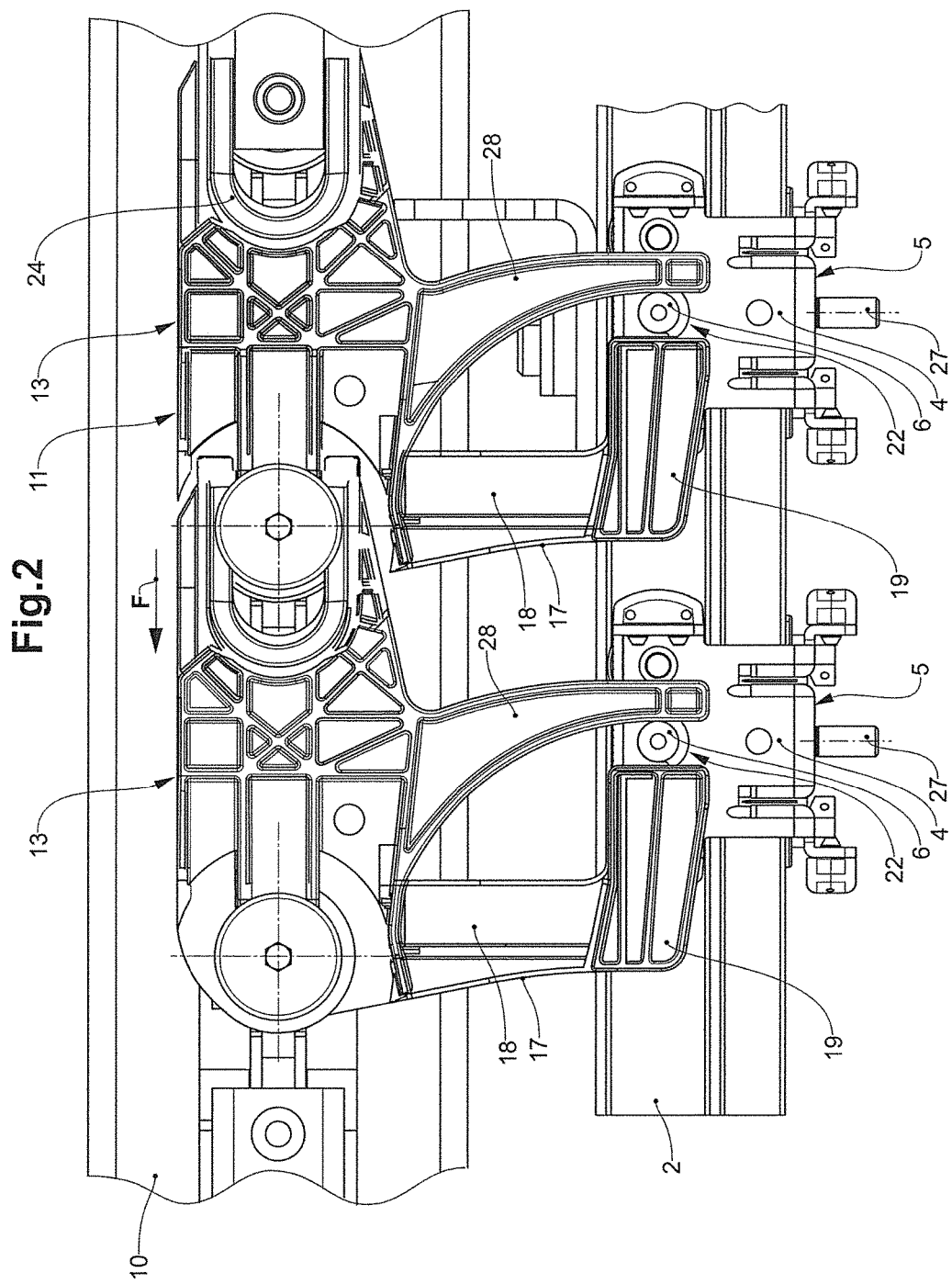
FIG. 2 is a lateral view of the conveying system according to FIG. 1.

FIGS. 1, 2, 4 and 5 show a conveying system 1 according to the invention, with a plurality of conveying vehicles 3 that are rolling led in the conveying direction F along a conveying rail 2. The conveying system 1 is designed as a suspended-conveying system, according to which the conveying vehicles 3 are arranged for the suspended conveying of conveyed objects below the conveying rail 2.

The conveying vehicles 3 each include a base body 4, to which several runner rollers 5 are rotatably fastened. These ensure a stable, but to a certain extent also rigid guidance of the conveying vehicles 3 along the conveying rail 2. "Rigid guidance" means that the conveying vehicles 3 can neither tilt to the front nor to the rear relative to the conveying rail 2 and also cannot tilt to the side, along the conveying direction F.

The conveying vehicles 3 each include contact studs 6, which project laterally from the base body 4, for creating a driving contact with a driver 13 of a driver chain 11.

The conveying vehicle moreover includes connecting pins 27 for attaching a holding member (not shown) on the conveying vehicle 3. The connecting pin 27 is directed downwards in the conveying position due to the fact that the conveying system 1 is designed as a suspended conveyor.

The conveying system 1 moreover includes a driver chain 11 with a plurality of drivers 13, which are arranged on a chain body 12, for forming a driving contact with the contact studs 6 on the conveying vehicle 3.

The drivers 13 are plastic parts, which are manufactured by way of injection moulding and which are fastened to the chain body 12 in a limitedly rotatable manner via a pivot body 23.

The chain body 12, which is subjected to high tensile forces, consists of metal.

Guide rollers 25 for the rolling guidance of the driver chain 11 along a subsequently described guide rail 10 are arranged on the chain body 12.

The conveying system 1 moreover includes a guide rail 10, which forms a guide channel 26 for receiving the chain body 12 of the driver chain 11. The chain body 12 is rollingly guided in the guide channel 26 via the guide rollers 25.

The drivers 13 each from a deflecting member 17 as well as a limitation arm 28.

The deflecting member 17 at its free end-sections forms a first limitation surface 21. The limitation arm 28 at its free end-section forms a second limitation surface 29. The two limitation surfaces 21, 29 lie opposite one another and enclose a receiver 22.

The deflecting member 17 includes an elastic deflecting section 18 as well as a guide body 19, which connects to the elastic deflecting section 18 and which also forms the first limitation surface 21 of the deflecting member 17. The guide body 19 is accordingly arranged in the free end-section of the deflecting member 17 and is connected to the base body 14 of the driver 13 via the deflecting section 18.

The conveying vehicle 3 is led onto the driver 13 with a movement component, which is directed parallel to the conveying direction F, as well as with a movement component, which is directed transversely to the conveying direction F and towards the driver 13, for creating the above-described driving contact between the conveying vehicle 3 or contact stud 6 and the driver 13.

The leading of the conveying vehicle 3 onto the driver 13 is effected in particular via a merging device (not shown), e.g. in the embodiment of a diverter.

The guide body 19 now forms a sliding surface 20, which ascends in a ramp-like manner in the direction of the receiver 22 towards the conveying rail 2 or the conveying vehicle 3. The ramp-like ascent of the sliding surface 20 moreover runs in the conveying direction F.

The ramp-like ascent of the sliding surface 20 is of such a nature that the contact stud 6 of the conveying vehicle 3 which is to be merged in runs onto the sliding surface 20 and along the ramp-like sliding surface 20 slides on the sliding surface 20 amid the deflection of the deflecting member 17. The contact stud 6 which slides onto the ramp-like sliding surface 20 thereby increasingly presses the guide body 19 away from the conveying vehicle 3 transversely to the conveying direction F.

With this procedure, the limitation surface 21 is also deflected away from the receiver 22 transversely to the conveying direction, by which means the receiver 22 is freed (opened) for the sliding-in of the contact stud 6. The contact stud 6 now slides over the sliding surface 20 into the freed receiver 22.

The pressing-away of the guide body 19 is effected on account of the rigid guidance of the conveying vehicle 3 along the conveying rail 2, the guidance not permitting any evasion movement of the conveying vehicle 3 or its contact stud 6 in the case of a lateral force action. Accordingly, the deflecting member 17 is pressed to the side by the contact stud 6.

The deflection force, which is exerted by the contact stud 6 onto the deflecting member 17, ceases to exist when the contact stud 6 slides from the sliding surface 20 into the receiver 22. The deflecting member 17 consequently moves back into its initial position on account of the acting restoring force.

Since the discontinuation of the deflecting force is effected in a sudden manner, the deflecting member 17 also moves abruptly back into its initial position. This has the effect of the contact stud 6 quasi snapping into the receiver 22.

With this procedure, the receiver 22 is blocked again towards the insertion side of the contact stud 6 due to the moving-back deflecting member 12 and accordingly due to the first limitation surface 21, which likewise moves back, so that the contact stud 6 can no longer escape out of the receiver 22 to the insertion side.

The conveying vehicles 3 and the driver chain 11 or the drivers 13 are moved in an equally running manner in the conveying direction F subsequently to the formation of the driving contact. With this procedure, the driven driver chain 11 drives the conveying vehicles 3 along the conveying path. The transmission of the driving force between the driver chain 11 and the conveying vehicle 3 is thereby effected from the limitation arm 28 onto the contact stud 6.

The invention claimed is:

1. A conveying system comprising:
   a conveying rail;
   at least one conveying vehicle that is led along the conveying rail, wherein the at least one conveying vehicle forms a contact element for forming a driving contact,
   a driver chain with at least one driver for driving the at least one conveying vehicle in a conveying direction, wherein the driver forms a receiver for receiving the contact element for the purpose of forming a driving contact, wherein the driver comprises a deflecting member that forms a spatial limitation for the receiver, wherein the deflecting member is elastically deflectable by the contact element while opening up the receiver.

2. The conveying system according to claim 1, wherein the deflecting member is elastically deflectable transversely to the conveying direction by way of the contact element.

3. The conveying system according to claim 1, wherein the deflecting member forms a sliding surface for the contact element, via which the contact element can slide into the receiver amid the deflection of the deflecting member.

4. The conveying system according to claim 3, wherein the sliding surface is designed as a sliding-on surface.

5. The conveying system according to claim 3, wherein the sliding surface is designed such that the contact element in a relative movement which is between the contact element and the driver chain and which runs essentially parallel to the conveying direction can slide on the sliding surface in the direction of the receiver amid an increasing deflection of the deflecting member.

6. The conveying system according to claim 3, wherein, considered in the conveying direction, the sliding surface is increasingly set back transversely to the conveying direction with respect to the contact element, which is assigned to the sliding surface.

7. The conveying system according to claim 3, wherein the contact element and the deflecting member are designed such that subsequently to the sliding surface, the contact element slides into the receiver in a relative movement between the contact element and the driver chain, said relative movement running parallel to the conveying direction.

8. The conveying system according to claim 7, wherein the design of the deflecting member and its arrangement on the driver is such that after the contact element has slid into the receiver, the elastically deflected deflecting member reassumes its initial position and thus secures the contact element against sliding out of the receiver in or counter to the conveying direction.

9. The conveying system according to claim 1, wherein the deflecting member forms an elastic deflecting section that connects onto a base body of the driver.

10. The conveying system according to claim 1, wherein a guide body that forms the sliding surface is formed at a free end of the deflecting member.

11. The conveying system according to claim 10, wherein the guide body forms a spatial delimitation for the receiver.

12. The conveying system according to claim 10, wherein the deflecting member forms an elastic deflecting section that connects onto a base body of the driver and wherein the guide body connects onto the elastic deflecting section.

13. The conveying system according to claim 1, wherein the receiver is spatially delimited by a limitation that is at the front considered in the conveying direction and by a rear limitation, wherein one of the limitations is formed by the deflecting member.

14. The conveying system according to claim 1, wherein the receiver is open transverse to the conveying direction.

15. The conveying system according to claim 1, wherein the receiver is arranged laterally of the conveying vehicle on forming a driving contact.

16. The conveying system according to claim 1, wherein the driver is rotatably mounted on a chain body of the driver chain about a rotation axis that is aligned transversely to the conveying direction.

17. The conveying system according to claim 16, wherein the driver is rotatably mounted on a chain body of the driver chain about a pivot body with a rotation axis that is aligned transversely to the conveying direction, and the driver forms a fork-like receiving section, and the driver with its fork-like receiving section encompasses the pivot body of a trailing driver of an equal construction.

18. The conveying system according to claim 1, wherein the at least one conveying vehicle comprises at least one runner roller, via which the conveying vehicle can roll along the conveying rail.

19. The conveying system according to claim 18, wherein the conveying vehicle comprises several runner rollers that are arranged on the conveying vehicle in a manner such that the conveying vehicle is rigidly guided along the conveying rail.

20. The conveying system according to claim 1, wherein the conveying vehicle comprises a holding member for holding a conveyed object.

21. A method for creating a driving contact between a conveying vehicle and a driver of a driver chain by way of a conveying system according to claim 1, comprising the steps of:
   moving the conveying vehicle into the merging a merging section and
   laterally leading the contact element of the conveying vehicle onto the driver chain;
   sliding the contact element onto the sliding surface of the deflecting member,
   deflecting the deflecting member transversely to the conveying direction amid the opening up of the receiver;
   moving the contact element into the opened up receiver subsequently to the sliding surface;
   moving the deflecting member back into its initial position and securing the contact element in the receiver.

* * * * *